Dec. 30, 1958   E. SCHNITZER   2,866,633
BAND PASS SHOCK ABSORBER
Filed Aug. 15, 1955
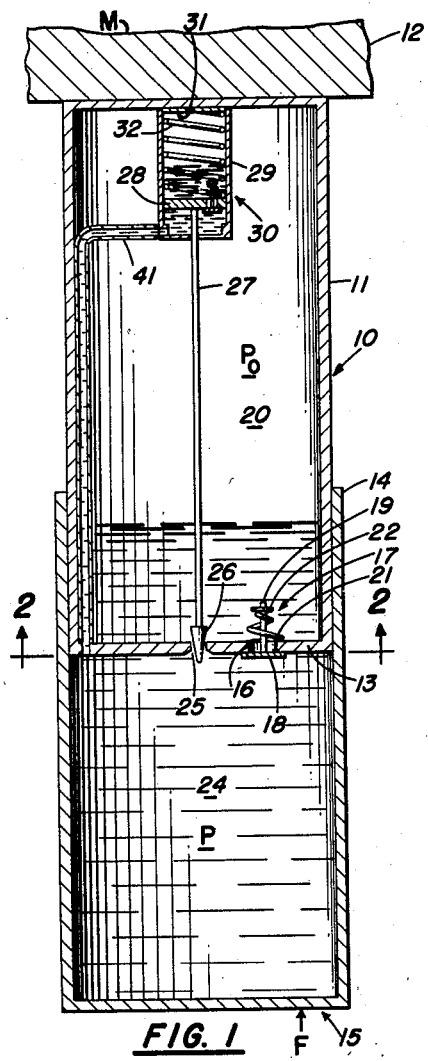
FIG. 1
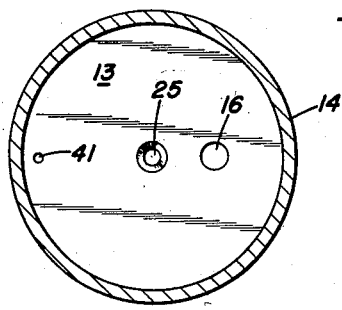
FIG. 2
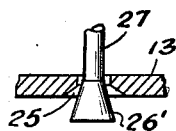
FIG. 6
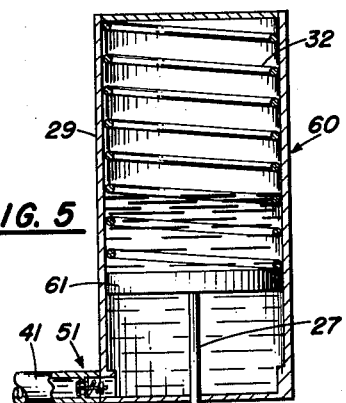
FIG. 3
FIG. 4
FIG. 5
INVENTOR.
EMANUEL SCHNITZER
BY
ATTORNEYS

United States Patent Office 2,866,633
Patented Dec. 30, 1958

2,866,633

BAND PASS SHOCK ABSORBER

Emanuel Schnitzer, Newport News, Va.

Application August 15, 1955, Serial No. 528,563

7 Claims. (Cl. 267—64)

(Granted under Title 35, U. S. Code (1952), sec. 266)

The invention described herein may be manufactured and used by or for the Government of the United States of America for governmental purposes without the payment of any royalties thereon or therefor.

This invention relates to shock struts or shock absorbers and vibration dampers with particular application to shock struts subject to either single disturbances of various rates of application or to successive disturbances of variable frequencies.

In shock absorber apparatus, as in aircraft, for example, it is important that shocks developing between the vehicle body and ground due to vehicle motion be absorbed without abnormal disturbance to the vehicular structure. This is particularly important in landing gear of aircraft where the problem of smooth landing is increased by runway irregularities and, in the case of seaplanes, by closely spaced sea waves.

Heretofore, in aircraft, for example, use has been made of two conventional telescoping piston-cylinder members containing a movement dampening liquid, one member being attached to the landing wheels and the other member to the fuselage. The piston is hollow to form an air chamber and the piston head is provided with an opening so dimensioned as to pass liquid on transfer of landing compression from the cylinder to the piston chamber. Since the size of this opening has been either fixed or regulated by a metering pin which could vary the opening only as a function of the strut telescoping displacement, such a shock absorber is effective primarily at a predetermined frequency of shock, which is generally of low value. Should a series of high frequency shocks be imposed on this absorber while adjusting to a low frequency shock or, even, initially, the device would operate to transmit these undesirable disturbances to the fuselage. In this connection, a high frequency shock or load pulse used herein is defined as one having a rapid rate of increase or as having considerable high frequency harmonic content.

Generally stated, the invention herein described is a shock strut modified to filter out disturbances having various rates of application or occurring in certain frequency ranges while retaining the required load arresting characteristics of a conventional shock strut in the remainder of the frequency spectrum.

An important object of the invention, therefore, is to provide a shock strut capable of attenuating shocks of a certain band, or bands of frequencies, without interfering with the normal frequency of shock absorption for the balance of the frequency spectrum.

More particularly, an object of the invention is to provide a shock absorber which meets the requirements for low frequency shock load restraint but, also, filters out high frequency shocks.

An object, also, is to provide a shock absorber which may be constructed to attenuate low frequency bands of strut shocks while passing a high frequency band.

Still another object of the invention is to permit passing of both high and low frequencies loads in a shock absorber while filtering shock loads of intermediate frequencies.

Another object of the invention is to permit passing of intermediate frequency loads in a shock absorber while filtering shock loads of both high and low frequencies.

The above objects apply not only to the single action aircraft type strut but also to the type of double action shock absorbers which exert damping influence both on extension and compression and which may be used as vibration dampers in machinery as well as vehicles.

Other objects and many of the attendant advantages of this invention will be readily appreciated as the same becomes better understood by reference to the following detailed description when considered in connection with the accompanying drawings wherein:

Fig. 1 is a vertical sectional view of a form of the shock absorber adapted for passing low frequency band loads;

Fig. 2 is a cross section of the absorber along lines 2—2 of Fig. 1, showing the telescoping tube piston head;

Fig. 3 is a detail vertical section of the control cylinder of Fig. 1;

Fig. 4 is a detail vertical section of the control cylinder of a modified shock absorber;

Fig. 5 is a detail vertical section of the control cylinder of another shock absorber modification; and Fig. 6 is a detail showing the metering pin valve head in inverted form.

The theory of the telescopic cylinder shock absorber is well known, that is, during the telescoping of the absorber a pressure is built up within it which acts in such a direction as to arrest the relative motion between the piston and cylinder. At any instant during this telescoping, the force developed is roughly proportional to the square of the telescoping velocity. Therefore, if a shock strut is mounted between a vehicle and its landing gear, a motion imparted to the landing gear in the axial direction of the strut will induce a pressure in the shock strut which will act to force the vehicle to have a reduced motion in the same direction. The applied force will generally be smaller than for a rigid strut in place of the shock strut.

For a disturbance of a given amplitude, the greater the frequency of application, the higher the telescoping velocity of the shock strut. Since for a conventional shock strut, as above stated, the load is roughly proportional to the square of the telescoping velocity, the higher the disturbance frequency, or rate of loading, the more resistance the strut exhibits to telescoping, until at high frequencies it is practically a rigid link.

The shock strut 10 as shown in Figs. 1, 2 and 3 is intended to meet the above problem by developing and absorbing low frequency loads and at the same time attenuating high frequency loads. The piston 11, which is a hollow shell, is attached at one end to the vehicular body 12, the other closed end 13 thereof slidably engaging the open end of the cylinder 14. The outer end 15 of cylinder 14 is closed. Cylinder 14 is fixed to a wheel or ski subject to contact with the ground or water waves or other earth bound or relatively rigid substance.

The head 13 of piston 11 is apertured to obtain opening 16, forming the seat of quick return dump valve 17 including valve cap 18 covering the outside of the opening, pin 19 connected to the cap and extending within the piston chamber 20, and coil expansion spring 21 pushing against the piston head 13 and a retainer ring 22 at the inner end of the pin. Head 13 is, also, apertured to obtain main orifice 25 which may be contoured to resemble a bell mouth shape with the largest diameter toward the outside of the piston to obtain high orifice efficiency and smooth flow. The metering pin 26 forms a valve head and is adapted to seat in orifice 25 to form a partial closure thereof, the pin being of either conical shape or some other contoured body of revolution with a large diameter base which faces toward the inside of the piston. The type of variable orifice valve represented by 25 and 26 has been selected for descriptive purposes only. Actually many other types of variable flow valves could be used instead. Also it should be pointed out that this variable flow valve, in which the openings depends on the frequency of the applied load pulse, can be combined with the type of variable flow valve heretofore used on aircraft shock absorbers in which the valve opening depends only on the strut telescoping displacement. For this combined valve, both the frequency of load application and strut telescoping position in combination would determine the size of the opening. Stem 27 connects the metering pin 26 to the control piston 28 in the cylinder 29 of metering pin control unit 30.

Control unit 30 includes, in addition to the cylinder 29 (which is attached at one end to the vehicle end of the shock absorber) and the reciprocatable metering pin control element or piston 28, the coil compression spring 32 between the piston 28 and the attached cylinder end 31 for regulating the height of liquid entering the cylinder space between the piston and cylinder end 31 and for returning the piston to its bottom position under conditions of equal pressure on both sides of the piston. Liquid transfer between opposite sides of the control piston 28 is effected by means of an opening 33 therethrough coupled with a fluid return dump valve 34. This valve includes a flat head 35 adapted for positioning below the opening 33 to cover the same, a stem 36 secured to the upper side of the valve head and extending within the cylinder chamber 37 formed by the piston head 28 and the cylinder space above it, and a compression spring 38 normally holding the valve closed by pressure against the piston 28 and a retaining ring 39 on the top end of stem 36. A small orifice 40 is formed in the flat valve head 35 to permit fluid flow into chamber 37 while the valve head 35 is closed, fluid flow from the chamber 37 occurring on opening of valve head 35 or on small pressure differences across piston 28 through orifice 40. Liquid is supplied to control unit 30 by means of a large diameter tube 41 connecting the shock strut piston head with the control unit at a point adjacent the lower end of the control unit. This tube offers low impedance to liquid flow.

In making use of the low band pass shock strut as described, the cylinder 14 is filled with a suitable liquid, as oil, to a point such that when the strut is extended to the limit imposed by the auxiliary structure the head of piston 11 is submerged. Assume a low rate of loading, that is, one where the force increases slowly with time. If this force, which may be designated F, is applied at the base of the strut, it is resisted by the mass of the vehicle M at the top of the strut. This growing load increases the pressure in the cylinder space 24, causing liquid to flow through main orifice 26 and, also, through tube 41 to the cylinder 29 of control unit 30, beneath control piston 28. Since the rate of increase of pressure is small, the flow through the frequency control orifice 40 in valve head 35 permits maintenance of essentially equal pressures on both sides of the piston 28, the pressure on the top side of the piston including the inflowing liquid as well as trapped air or other gas. This air or gas, acts as a spring in chamber 37 and may be replaced by its engineering equivalent in practical designs, namely, a metal spring or some other resilient body or medium. With equal opposite pressures on piston 28, the spring 32 maintains the piston 28 close to its bottom position, holding metering pin 26 open at an approximately constant value. Since the air pressure in control cylinder space 37 increases approximately at the same rate as the liquid pressure below control piston 28, the strut behaves as a fixed orifice shock absorber. When the force F decreases and for those cases where it is desired to quickly recycle the strut for another low frequency load, the dump valve 17 allows the fluid to return rapidly from chamber 20 to chamber 24 thus returning the strut to its original untelescoped position. For those cases where there is ample time between loading pulses for the fluid to return through orifice 25, the dump valve 17 is not required. In fact in some cases it is even desirable to employ an additional buffer action allowing the strut to re-extend only very slowly.

Should a high rate of loading, that is, a rapid increase of load with time, be imposed on the strut, a different set of conditions develop, the pressure P rising rapidly, forcing liquid into the lower compartment of the control unit 30 below piston 28 at such a high rate that it cannot bleed through the frequency control orifice 40 fast enough to allow the control piston 28 to remain on its seat. This piston, therefore, rises, raising the metering pin and increasing the effective size of the orifice 25 in the piston head 13, allowing liquid to flow through this valve at an increased rate. This, in turn, allows the strut to telescope rapidly while simultaneously reducing the developed load.

As the pressure P originated by the high frequency pulse decreases, the pressure below control piston 28 drops and spring 32, in combination with the air pressure in chamber 37, forces the piston down against its seat, thus closing the metering pin orifice 25 to a reduced area in readiness for new load impulse, such as a low frequency load. As soon as the metering pin valve 26 reaches its point of reduced opening, the pressure difference above and below control piston 28 opens the liquid return dump valve 34, permitting liquid above the piston to return to its equilibrium value in preparation for the next high frequency pulse. The dump valve 34 is included arbitrarily to provide for conditions of closely spaced load pulses having rapid rates of rise since for struts subjected to widely spaced rapid rise type pulses there would be time for the fluid in chamber 37 to drain through orifice 40 between successive pulses. The equilibrium level in the control cylinder is determined by the instantaneous magnitude of the low frequency pulse in existence at the time of consideration. Although the low and high frequency cases have been described as separate type actions, it should be borne in mind that a gradual transition exists in some region between the two for an intermediate band of frequencies and that both high and low frequency load pulses can be impressed on the strut simultaneously.

As described, the low pass strut overcomes the rigidity at high frequencies of the conventional shock strut. For the low pass strut, the orifice size increases as the rate of loading becomes more rapid. Thus, for the higher rates of loading (high frequency disturbances), the telescoping resistance of the shock strut is reduced as compared to a conventional shock strut and all loads, regardless of rate of application, can be reduced to substantially similar magnitudes. This does not imply a constant force shock strut, however, which for most impacts would deliver the large design load which, in turn, leads to more rapid fatigue failures. The described low pass strut greatly attenuates high frequency transients and allows lower frequency loads to be developed and absorbed.

The low band pass shock strut as described exemplifies a specific use of the invention which may now be more broadly defined as a shock strut provided with an interacting piston and cylinder forcing fluids through an orifice, with load frequency sensitive means for varying the orifice area or its equivalent as a function of the frequency of the applied disturbance, or rate of loading. It may be seen, accordingly, that the shock strut may be changed to meet different needs by the expedient of modifying the control unit and thereby the metering pin valve actuation.

In Fig. 4, for example, a control unit 50 is shown which is identical to control unit 30 except for the insertion, in the end of tube 41 adjacent the control cylinder 29, of a control cylinder dump valve 51 similar to dump valves 34 in that it includes a valve plate and stem and a coil spring for holding the plate normally closed against the annular internal flange 52. The valve plate is provided, also, with an orifice, 53, which has less impedance to flow than orifice 40, and opens away from the control cylinder so that any downward movement of piston 28 will open the valve for out flow of fluid whereas fluid pressure in tube 41 toward the control cylinder will close the valve, permitting only reduced flow of fluid through orifice 53.

The shock absorber equipped with the control unit of Fig. 4 may be described as a high-low band pass shock strut in that it passes the high and low frequency bands of load disturbances for arrest in the conventional way while selecting the intermediate frequency band load disturbances for attenuation. In use, a low frequency impulse forces liquid through the main orifice 25 and through orifice 53 in valve 51 and orifice 40 in valve 34 at such speed as to permit pressure equalization on control piston 28 and a constant opening at metering valve 26. For high frequency loads, practically no fluid reaches piston 28 in the pressure period. Consequently, with low and high frequency loads the unit behaves as a conventional shock strut with a fixed area orifice between upper and lower chambers. In the intermediate frequency range, however, pressures are communicated to the control piston 28 which moves to open the main metering valve 26 and attenuate the shock.

The high-low band pass shock strut may be converted to the intermediate band pass shock strut merely by inverting the more or less conical valve head 26 at the lower end of the rod 27 to form the valve head 26' (Fig. 6). The control unit of Fig. 4 would remain unchanged. The intermediate band pass strut would pass some intermediate frequency band of load disturbances in the conventional way while selecting the low and high frequency band load disturbances for attenuation. In use a low frequency impulse forces liquid through the main orifice 25, and through orifice 53 in valve 51 and orifice 40, at such speed as to permit pressure equalization on control piston 28 and a constant large opening at metering valve 26, resulting in low strut resistance to such loads. For high frequency loads, practically no fluid reaches piston 28 in the pressure period. Consequently, for low and high frequency loads the large main orifice opening tends to attenuate shocks. In the intermediate frequency range, however, pressures are communicated to the control piston 28 which moves to close down the main metering valve 26 to the size where this strut behaves as a conventional fixed orifice shock absorber.

The invention, also, comprehends arrangements such as is illustrated in Fig. 5. In this modification, which may be designated a high frequency load band pass, the apparatus filters out the low and middle frequency loads for attenuation and passes the high frequency loads for handling by the conventional shock strut means. In Fig. 5, the parts of control unit 60 are identical to those of Fig. 4 with the exception of piston 61 which differs over piston 28 of Figs. 3 and 4 by the elimination of the piston dump valve 34 with the associated orifice 40. In use, low and intermediate load frequencies are attenuated since pressure is transmitted to the solid control piston 60 to open metering valve 26, whereas high load frequencies are transmitted as in conventional struts since the small orifice in valve 51 keeps high frequency pressure pulses out of control unit 60.

Figs. 3, 4 and 5 are illustrative of specific uses of the shock strut to meet specific needs. Obviously, adjustment of the control unit may be made to meet other requirements such as where the frequency spectrum analysis of disturbances imposed on the vehicle, or other support, indicates worst loads or motions at some specific band of frequencies.

The shock absorber has been described, for illustrative purposes, in connection with aircraft but limitation to such use is not necessarily intended, or implied, adaptations to various mechanisms including vehicles, machines, and instruments being readily made. Liquids and air are the specific fluids referred to as usable in the piston-cylinder chambers but, conceivably some applications may require all liquid or all gas fillers. The control unit for regulating the size of the main metering orifice may also, be readily replaced by electrical, mechanical or other hydraulic devices. In view of the general applications possible in the shock absorber, as above indicated, the terms "plunger" and "receiver" will be used in some of the claims in place of "piston" and "cylinder," respectively, and the term "element" will be used in place of "landing gear" and "vehicle body."

The control unit 30 has been specifically described as such, but it also is subject to definition as a differential sensor including the air containing control cylinder 29 and duct 41 connecting this cylinder to strut chamber 24, a differentiator or phase shifter including the control piston 28 containing orifice 40 and balanced by spring 32, the frequency selective filter including the piston 28, orifice 40 therein and spring 32 modified in size to be sensitive to selected frequencies, and the damping controller or amplifier including piston 28, stem 27 connecting to the damping device including valve 26.

Obviously many other modifications and variations of the present invention are possible in the light of the above teachings. It is therefore to be understood that within the scope of the appended claims the invention may be practiced otherwise than as specifically described.

What is claimed is:

1. A shock strut for aerial vehicles and the like provided with landing gear comprising a main cylinder connected to the landing gear adapted to receive a fluid for energy transfer, a main piston slidably mounted in said main cylinder and connected to the vehicle body, said piston being hollow and provided with an orifice therein for passage of said fluid between the cylinder and piston, a valve inserted in said orifice for varying the open orifice area, and means for adjusting the valve in said orifice operative only at predetermined rates or frequencies of strut loading, said valve adjusting means including a control cylinder attached to said main piston, an open fluid duct between said main cylinder and control cylinder, a control piston movable in said control cylinder, provided with an open orifice therethrough, a stem passing through an end of said control cylinder and connecting said control piston and said orifice valve, a spring seated in said control cylinder between the control piston and control cylinder end on the side of the control piston opposite to said stem, and means for inactivating said control piston within a predetermined band of rates or frequencies of applied pressures on said control piston, said fluid duct having connection to said control cylinder on the stem side of said control piston only.

2. The shock strut as defined in claim 1, including additionally a dump valve movable in said control piston orifice to release fluids to said fluid duct, and means for normally holding said dump valve closed.

3. The shock strut as defined in claim 1, including additionally a dump valve positioned in said fluid duct adjacent said control cylinder for permitting outflow of fluid from said control cylinder and resilient means normally holding said dump valve in closed position, said dump valve having an opening therethrough of reduced cross-section, permitting limited flow of fluid from said duct to said control cylinder.

4. A shock strut for aerial vehicles and the like provided with landing gear comprising a main cylinder connected to the landing gear adapted to receive a fluid for energy transfer, a main piston slidably mounted in said main cylinder and connected to the vehicle body, said piston being hollow and provided with an orifice therein for passage of said fluid between the cylinder and piston, a valve inserted in said orifice for varying the open orifice area, and means for adjusting the valve in said orifice in accordance with the rate of loading of said strut between selected frequencies, said valve adjusting means including a control cylinder attached to said main piston, a fluid duct between said main cylinder and control cylinder, a control piston movable in said control cylinder provided with an orifice therethrough, a stem passing through an end of said control cylinder and connecting said control piston and said orifice valve, a spring seated in said control cylinder between the control piston and control cylinder end on the side of the control piston opposite to said stem, and valvular means for modifying the movement of said control system, said control piston modifying means comprising a dump valve movable in a control piston opening to release fluids to said fluid duct, means for normally holding said dump valve closed, a duct dump valve positioned in said fluid duct adjacent said control cylinder for permitting outflow of fluid from said control cylinder, and resilient means normally holding said duct dump valve in closed position, said duct dump valve having an opening therethrough of reduced cross-section, permitting limited flow of fluid from said duct to said control cylinder.

5. A shock strut for aerial vehicles and the like provided with landing gear comprising a main cylinder connected to the landing gear adapted to receive a fluid for energy transfer, a main piston slidably mounted in said main cylinder and connected to the vehicle body, said piston being hollow and provided with an orifice therein for passage of said fluid between the cylinder and piston, a valve inserted in said orifice for varying the open orifice area, and means for adjusting the valve in said orifice operative only at predetermined rates or frequencies of strut loading, said valve adjusting means including a control cylinder attached to said main piston, an open fluid duct between said main cylinder and control cylinder permitting a normal range of fluid flow therebetween, a control piston movable in said control cylinder provided with an open orifice therethrough, said control piston orifice having dimensions permitting pressure equilization of said control piston for reduced fluid flow into said control cylinder from said duct and preventing pressure equilization of said control piston for increased fluid flow into said control cylinder, a stem passing through an end of said control cylinder and connecting said control piston and said main piston orifice valve, and a spring seated in said control cylinder between the control piston and control cylinder end on the side of the control piston opposite to said stem, said fluid duct having connection to said control cylinder on the stem side of said control piston only.

6. The shock strut as defined in claim 5, said fluid duct having an orifice at the control cylinder end thereof, said duct orifice having an area reduced in dimensions over that of said control piston orifice.

7. A shock strut for aerial vehicles and the like provided with loading gear comprising a main cylinder connected to the landing gear adapted to receive a fluid for energy transfer, a main piston slidable mounted in said main cylinder and connected to the vehicle body, said piston being hollow and provided with an orifice therein for passage of said fluid between the cylinder and piston, a valve inserted in said orifice for varying the open orifice area, and means for adjusting the valve in said orifice operative only at predetermined rates or frequencies of strut loading, said valve adjusting means including a control cylinder attached to said main piston, an open fluid duct between said main cylinder and control cylinder permitting a normal range of fluid flow therebetween, a control piston movable in said control cylinder, a stem passing through an end of said control cylinder and connecting said control piston and said main piston orifice valve, a spring seated in said control cylinder between the control piston and control cylinder end on the side of the control piston opposite to said stem, said fluid duct having connection on the stem side of said control piston only, and an orifice in said duct having an area reduced below the duct transverse area and located at the control cylinder end of said duct.

References Cited in the file of this patent

UNITED STATES PATENTS

| | | |
|---|---|---|
| 2,095,112 | Wallace | Oct. 5, 1937 |
| 2,148,497 | Peck | Feb. 28, 1939 |
| 2,381,532 | Focht | Aug. 7, 1945 |
| 2,469,912 | Bachman | May 10, 1949 |
| 2,570,362 | Mercier | Oct. 9, 1951 |
| 2,606,760 | Schlegel | Aug. 12, 1952 |